T. G. SAMUEL.
SAFETY ATTACHMENT FOR STREET CARS AND THE LIKE.
APPLICATION FILED FEB. 8, 1913.

1,097,472.

Patented May 19, 1914.

2 SHEETS—SHEET 1.

Witnesses

T. G. Samuel,
Inventor by C. A. Snow & Co.
Attorneys

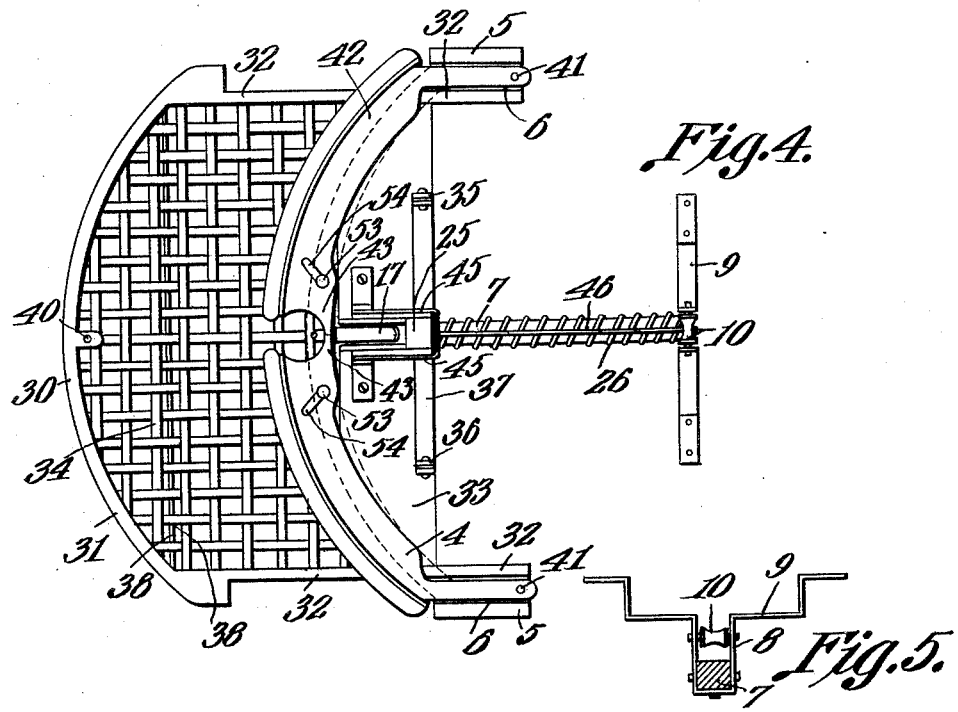

UNITED STATES PATENT OFFICE.

TOWFEECK G. SAMUEL, OF PORTLAND, OREGON.

SAFETY ATTACHMENT FOR STREET-CARS AND THE LIKE.

1,097,472.

Specification of Letters Patent.  Patented May 19, 1914.

Application filed February 8, 1913. Serial No. 747,187.

*To all whom it may concern:*

Be it known that I, TOWFEECK G. SAMUEL, a citizen of the United States, residing at Portland, in the county of Multnomah and State of Oregon, have invented a new and useful Safety Attachment for Street-Cars and the like, of which the following is a specification.

This invention relates to safety attachments for cars, one of its objects being to provide a fender normally held retracted under the front end of the car and which is adapted to be released by an obstruction in the path thereof and to be automatically projected, when released, so as to move close to the ground and against or under the obstruction.

A further object is to provide improved means for releasing the fender, said means including a bumper which is normally supported in front of the fender and which will be first contacted by the obstruction without, however, producing any injury thereto.

Another object is to provide novel means for automatically locking the fender when it is drawn back to retracted position and for also locking the fender automatically after it has been projected to active position.

A further object is to provide a cushioning means upon the front of the car and above the fender and with which the obstruction is adapted to contact.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
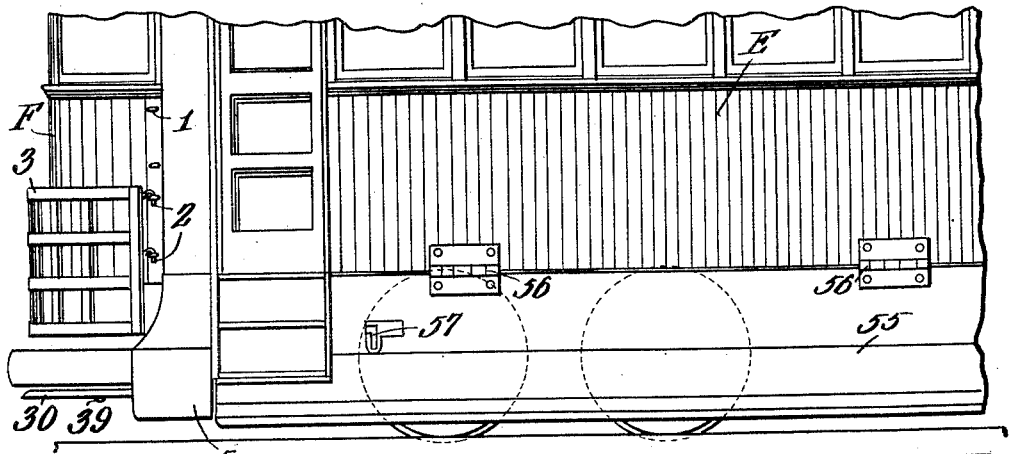
Figure 2:
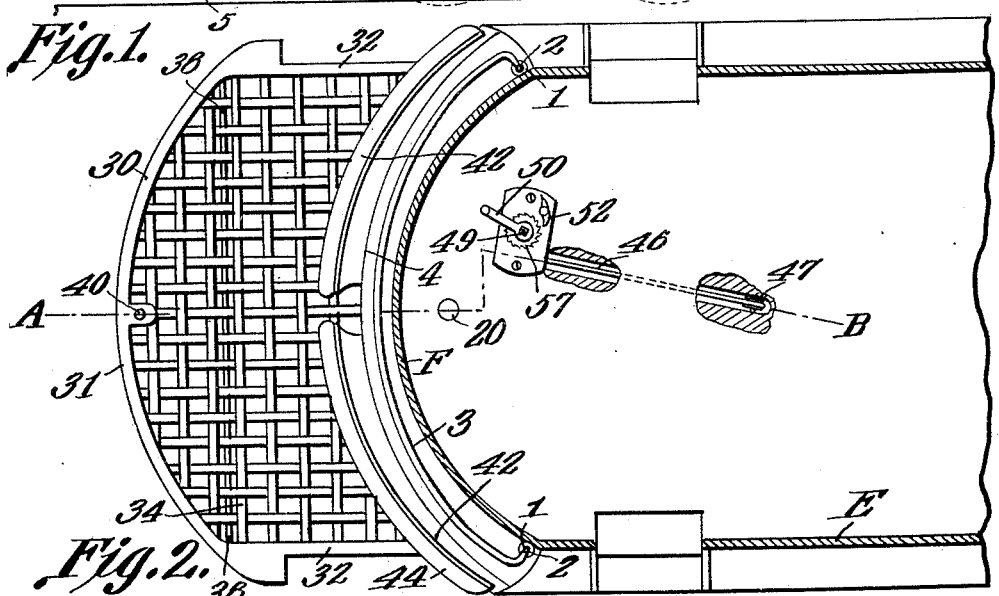
Figure 3:
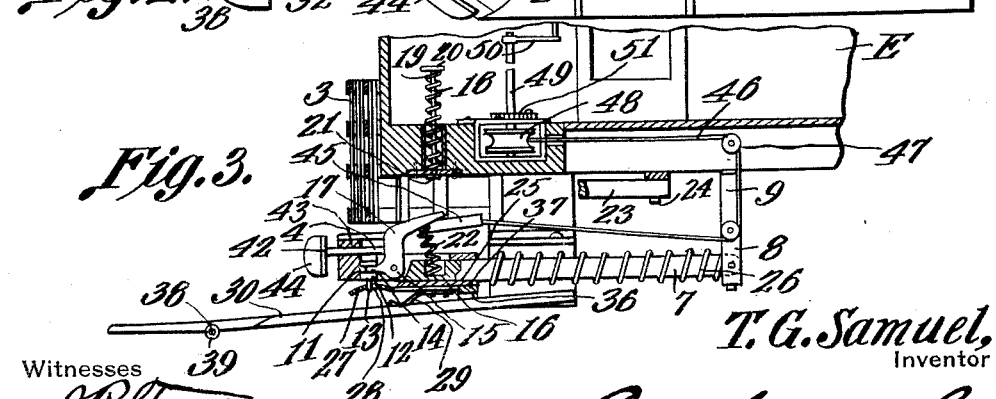

In said drawings:—Figure 1 is a side elevation of a portion of a car having the present improvements combined therewith, the fender being shown in its normal or retracted position. Fig. 2 is a horizontal section through a portion of the car, the fender being shown in plan and projected to active position. Fig. 3 is a section on line A—B Fig. 2, the fender being shown in elevation. Fig. 4 is a plan view of the fender and adjacent parts, the arcuate guide bar being removed but its position being indicated by dotted lines. Fig. 5 is a front elevation of the bracket employed for guiding the fender in its movement. Fig. 6 is a detail view of the draw bar and the link used in connection therewith.

Referring to the figures by characters of reference E designates a portion of a car structure. Arranged on the front face of the front or dash-board F of the car are outstanding supporting eyes 1 arranged in pairs and located adjacent the sides of the car. These eyes are designed to receive hooks 2 extending from the ends of an arcuate metallic cushion 3 made up of lattice work formed of resilient bands of metal such as spring steel, brass or the like. This cushion extends in front of a portion of the dash-board and downwardly close to an arcuate guide rail which is arranged under the dash-board, as shown at 4 and is secured, at its ends, upon blocks 5 in which grooves or recesses 6 are formed. These blocks are fixedly connected to the front portion of the car structure at the sides thereof and in any suitable manner.

Extending under and fixedly secured to the middle portion of the arcuate guide plate 4 is the front end of a guide bar 7 which is preferably angular in cross sectional contour and is supported, at its rear end, by a yoke 8 extending downwardly from the center of a bracket 9 which is bolted or otherwise secured to the bottom of the car body. A spool 10 is journaled within the yoke 8 and above the bar 7 and is for the purpose hereinafter set forth.

Extending upwardly through the guide bar 7 near its front end and back of the adjacent portion of the guide strip 4 is a passage 11 in which a block 12 is mounted to slide, this block having a locking pin 13 projecting downwardly from its lower end. Block 12 is loosely engaged by one arm 14 of a bell crank lever 15, this lever being fulcrumed within a recess 16 in bar 7 and having an upwardly and rearwardly extending arm 17 which extends toward the bottom of the car body E and directly under the lower end of a shifting rod 18 which is slidably mounted within and extends upwardly from the bottom of the car body at a point where it can be conveniently actuated by a foot of the motorman. A spring 19 is employed for holding rod 18 normally elevated, as shown in Fig. 3. This rod has a foot plate 20 at its upper end and an enlargement 21 at its lower end, said enlargement being adapted, when rod 18 is pushed downwardly, to move against the arm 17 of the bell crank lever and thus depress said arm and cause arm 14 to move upwardly, thereby lifting the locking pin 13. A spring 22 is interposed between arm 17 and the bar 7 and serves to hold said arm 17 normally elevated. This arm, however, does not normally contact with the enlargement 21 but, instead, is spaced therefrom so as to permit a draw bar, such as indicated at 23 and which is pivotally connected to the car at 24, to swing laterally between the arm 17 and the rod 18. This draw bar is used for coupling purposes and any suitable form of coupler may be used in connection therewith. It is to be understood that when the hooks 2 are in engagement with the uppermost eyes 1, the cushion 3 will be supported above the path of the draw bar 23.

An angular sleeve 25 is slidably mounted on the bar 7 and is normally contacted by one end of a coiled spring 26 which is mounted on the bar 7 and bears at its other end against the yoke 8. Thus the spring serves to hold sleeve 25 normally pressed toward the front end of bar 7. A leaf spring 27 is secured to the bottom of the sleeve 25 and extends forwardly therefrom, the free end of this spring being downturned and there being an opening 28 in the spring adapted to receive pin 13 when the sleeve 25 is in its normal or foremost position. Another leaf spring 29 extends downwardly from the sleeve 25 and bears upon the upper surface of the fender body 30 which, as shown in the drawings, is preferably made up of an arcuate front bar 31, parallel side arms 32, a segmental rear cross plate 33, and interlaced strips 34 of spring metal, such as steel, brass or the like, said strips being riveted or otherwise secured to the bars 31 and 32 and to the plate 33. The side bars 32 of the fender body are guided between the blocks 5 so as thus to be held against lateral displacement. Ears 35 extend upwardly from the rear portion of the segmental plate 33 and are pivotally connected to ears 36 extending from the ends of a cross bar 37, this bar being integral with or secured to the sleeve 25. A rod 38 extends transversely within the fender body near the front end thereof and has rollers 39 mounted thereon, these rollers being adapted to contact with the ground and thus support the fender body close to but out of contact with the ground. An opening 40 is formed in the middle portion of the fender body adjacent the front thereof and is adapted, when the fender body is retracted under the car, to receive the locking pin 13, the fender body being thus held retracted and with spring 26 under stress.

Pivotally connected to the guide strip 4 adjacent the sides of the car and as shown at 41, are arcuate bumper plates 42 which extend in front of and below the guide strip 4 and are provided at their inner or forward ends with tongues 43 resting on the front end of the bar 7 and in front of the upwardly extending portion of arm 17. These bumper plates 42 have cushions 44 of any suitable material upon their front faces, these cushions being supported in front of the guide strip 4 and likewise in front of the cushion 3 and in front of the fender body when said body is in its retracted position.

A yoke 45 is connected to and extends rearwardly from the fender body and has a chain, cable or other suitable flexible connection 46 secured thereto, this connection extending under the spool 10 and thence upwardly to another spool 47 carried by the car body. From this spool the connection extends forward to a drum 48 which is secured to and rotates with a shaft 49 extending upwardly from the floor of the car at a point where it can be easily actuated by the motorman. A crank arm 50 may be connected to the upper end of shaft 49 to facilitate the rotation thereof and a ratchet wheel 51 can be secured to the shaft 49, this ratchet wheel being normally engaged by a pawl 52.

From the foregoing description it will be apparent, that by rotating the shaft 49, the connection 46 can be wound on the drum 48, and may thus pull on the yoke 45, so as to draw the fender body rearwardly and slide the sleeve 25 toward the yoke 8, thereby compressing the spring 26. When the fender body has been brought back to a predetermined position, the pin 13 will become seated within the opening 40, thus locking the fender in its rearmost position. It is to be understood, of course, that the fender cannot be pulled backwardly until pin 13 has been lifted out of engagement with spring 27. This actuation of the pin can be effected by depressing arm 17 by means of the rod 18. When the fender is locked in retracted position it will remain in such position until released. This release can be effected either by pushing downwardly on rod 18 so as to depress arm 17 and thus lift pin 13 out of opening 40, or can be effected by an obstruction contacting with either of the bumpers 44. When either bumper is pushed rearwardly, the tongue 43 thereof will press against arm 17 and cause the bell crank lever 15 to lift pin 13 out of engagement with the fender body. Thus spring 26 will be brought into play promptly and will shift the fender body forwardly until spring 27 is brought into engagement with pin 13. During this forward movement of the fender body spring 15 presses it downwardly so as to hold the wheels or rollers 39 in contact with the ground. It is to be understood, of course, that after the fender body has been retracted and locked, the pawl 52 should be disengaged from the ratchet wheel 51 so that, when the bumper is pushed rearwardly so as to unlock the fender body, the automatic forward projection of said fender body will not be interfered with by the pawl and the ratchet. During the forward movement of the fender body the obstruction in the path of the car will be caused to fall onto said body and, if thrown against the cushion 3, will not be subjected to severe injury. In order to hold the bumper plates in position at their forward ends, guide pins 53 are extended from strip 4 and into slots 54 in the plates, as shown.

As shown in Fig. 1 a suitable wheel guard 55 may be hingedly connected as at 56 to the side of the car, the same being held in place in any suitable manner, as by means of a latch shown generally at 57. Inasmuch as this wheel guard and its securing means constitute no part of the present invention, it is not deemed necessary to enter into a detailed description thereof.

The draw bar 23 is provided with a detachable link 68 whereby two cars can be coupled together.

What is claimed is:—

1. The combination with a car structure, of a fender movably mounted thereunder, bumpers in front of the structure and adapted to project forwardly beyond the fender when said fender is retracted, said bumpers being extended toward opposite sides of the car respectively from the center, means for locking the fender in retracted position, means operated by either bumper when brought into contact with an obstruction for unlocking the fender, means for automatically projecting the fender forwardly when unlocked, means movable with the fender and coöperating with said locking means for automatically securing the fender in projected position, and means under the control of a person on the car for unlocking the fender when projected.

2. The combination with a car structure, of a fender movably mounted thereunder, bumpers in front of the structure and adapted to project forwardly beyond the fender when said fender is retracted, means for locking the fender in retracted position, means operated by either bumper when brought into contact with an obstruction for unlocking the fender, means for automatically projecting the fender forwardly when unlocked, means movable with the fender and coöperating with said locking means for automatically securing the fender in projected position, and separate means under the control of a person upon the car for unlocking the fender when in projected position and for retracting said fender.

3. The combination with a car structure and an arcuate guide strip secured thereunder, of a fender, a guide bar connected to the structure and guide strip, sleeves slidable on the bar, a hinged connection between the sleeve and the fender, means interposed between the fender and sleeve for shifting one end portion of the fender into contact with the ground, a locking device carried by the bar, means connected to the sleeve for engaging said device for holding the fender in projected position, a spring upon the bar for automatically projecting the fender and sleeve toward one end of the car, means upon the fender for engaging said locking device to hold the fender in retracted position and the spring under stress, and means for actuating the locking device to release the fender when in either projected or retracted position.

4. The combination with a car structure and an arcuate guide strip secured thereunder, of a fender, a guide bar connected to the structure and guide strip, a sleeve slidable on the bar, a hinged connection between the sleeve and the fender, means interposed between the fender and sleeve for shifting one end portion of the fender into contact with the ground, a locking device carried by the bar, means connected to the sleeve for engaging said device to hold the fender in projected position, a spring upon the bar for automatically projecting the fender and sleeve toward one end of the car, means upon the fender for engaging said locking device to hold the fender in retracted position and the spring under stress, a bumper movably connected to the guide strip, and means actuated thereby when brought into contact with an obstruction for actuating the locking device to release the fender when in retracted position.

5. The combination with a car structure and an arcuate guide strip secured thereunder, of a fender, a guide bar connected to the structure and guide strip, a sleeve slidable on the bar, a hinged connection between the sleeve and the fender, means interposed between the fender and sleeve for shifting one end portion of the fender into contact with the ground, a locking device carried by the bar, means connected to the sleeve for engaging said device to hold the fender in projected position, a spring upon the bar for automatically projecting the fender and sleeve toward one end of the car, means upon the fender for engaging said locking device to hold the fender in retracted position and the spring under stress, a bumper movably connected to the guide strip, means actuated thereby when brought into contact with an obstruction, for actuating the locking device to release the fender when in retracted position, a winding device upon the structure, and means actuated thereby for retracting the fender and placing the spring under stress.

In testimony that I claim the foregoing as my own, I have hereto affixed my signature in the presence of two witnesses.

TOWFEECK G. SAMUEL.

Witnesses:
M. APACH,
E. E. COOVERT.

Copies of this patent may be obtained for five cents each, by addressing the "Commissioner of Patents, Washington, D. C."